United States Patent
Kato (10) Patent No.: US 9,178,225 B2
(45) Date of Patent: Nov. 3, 2015

(54) FUEL CELL

(75) Inventor: Chisato Kato, Aichi-gun (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 922 days.

(21) Appl. No.: 11/812,884

(22) Filed: Jun. 22, 2007

(65) Prior Publication Data

US 2007/0298310 A1 Dec. 27, 2007

(30) Foreign Application Priority Data

Jun. 26, 2006 (JP) ................. 2006-175223

(51) Int. Cl.
*H01M 8/02* (2006.01)
*H01M 4/86* (2006.01)
*H01M 8/04* (2006.01)
*H01M 8/10* (2006.01)

(52) U.S. Cl.
CPC ............ *H01M 8/0271* (2013.01); *H01M 4/861* (2013.01); *H01M 4/8642* (2013.01); *H01M 8/0247* (2013.01); *H01M 8/04089* (2013.01); *H01M 8/026* (2013.01); *H01M 8/0258* (2013.01); *H01M 8/0263* (2013.01); *H01M 8/0265* (2013.01); *H01M 8/0273* (2013.01); *H01M 8/0276* (2013.01); *H01M 2008/1095* (2013.01); *Y02E 60/50* (2013.01)

(58) Field of Classification Search
CPC . H01M 8/0258; H01M 8/026; H01M 8/0263; H01M 8/0265; H01M 4/861; H01M 4/8642; H01M 4/0247; H01M 4/04089; H01M 8/0271; H01M 8/0273; H01M 8/0276

USPC .............................................. 429/39, 34, 35
See application file for complete search history.

(56) References Cited

U.S. PATENT DOCUMENTS

| | | | |
|---|---|---|---|
| 5,464,700 A | 11/1995 | Steck et al. | |
| 6,057,054 A * | 5/2000 | Barton et al. | 429/42 |
| 6,610,435 B1 * | 8/2003 | Maruyama et al. | 429/34 |
| 2004/0161655 A1 * | 8/2004 | Murphy et al. | 429/36 |
| 2005/0191539 A1 * | 9/2005 | Yoshioka et al. | 429/38 |
| 2006/0068252 A1 * | 3/2006 | An et al. | 429/26 |
| 2007/0003821 A1 * | 1/2007 | Belchuk | 429/44 |
| 2007/0298308 A1 * | 12/2007 | Yamamoto et al. | 429/34 |

FOREIGN PATENT DOCUMENTS

| | | |
|---|---|---|
| CA | 2447433 A1 | 11/2002 |
| CA | 2233440 C | 12/2002 |

(Continued)

OTHER PUBLICATIONS

PCT/JP2006/300679, not publ. filed Jan. 12, 2007.

(Continued)

*Primary Examiner* — Milton I Cano
*Assistant Examiner* — Stephen Yanchuk
(74) *Attorney, Agent, or Firm* — Kenyon & Kenyon LLP (57) ABSTRACT

In a fuel cell in which an electrode and a separator are stacked together, a rib which is provided on the separator and forms a reaction gas flow path is fixed to an electrode by a liquid sealant, and the porosity of a portion of the electrode which has been impregnated with the liquid sealant is lower than the porosity of another portion of the electrode. In order to store surplus liquid sealant, the separator may also have a liquid sealant storage portion that is depressed in the thickness direction from the top of the rib.

11 Claims, 7 Drawing Sheets

(56) References Cited

FOREIGN PATENT DOCUMENTS

| | | |
|---|---|---|
| JP | 11-154522 A | 6/1999 |
| JP | 2001-076746 A | 3/2001 |
| JP | 2002-367631 A | 12/2002 |
| JP | 2003-197224 A | 7/2003 |
| JP | 2004-119121 A | 4/2004 |
| JP | 2004-207041 A | 7/2004 |
| JP | 2005-855594 A | 3/2005 |
| JP | 2005-093243 A | 4/2005 |
| JP | 2005-100970 A | 4/2005 |
| JP | 2005-108505 A | 4/2005 |
| JP | 2005-183210 A | 7/2005 |
| JP | 2007-287487 A | 11/2007 |
| WO | WO 2006/075786 | 7/2006 |

OTHER PUBLICATIONS

Office Action issued Jan. 5, 2012 in Japanese Application No. 2006-175223 and English translation thereof.

* cited by examiner

FUEL CELL

INCORPORATION BY REFERENCE

The disclosure of Japanese Patent Application No. 2006-175223 filed on Jun. 26, 2006, including the specification, drawings and abstract is incorporated herein by reference in its entirety.

BACKGROUND OF THE INVENTION

1. Field of the Invention

The invention relates to a fuel cell. More particularly, the invention relates to an improvement in the structure of a fuel cell.

2. Description of the Related Art

A fuel cell (such as a polymer electrolyte fuel cell) is typically made by stacking together a plurality of cells each having an electrolyte sandwiched between separators. These separators are provided with ribs (gas flow path ribs) which form flow paths by dividing the area through which reaction gases (i.e., fuel gas and oxidizing gas) flow. These gas flow path ribs are generally parallel with one another, for example.

Conventionally, when a separator is provided with such ribs, ribs that divide adjacent flow paths where the reaction gas flows in opposite directions are often wider than ribs that divide adjacent flow paths where the reaction gas flows in the same direction (see Japanese Patent Application Publication No. JP-A-2001-76746, for example). This is mainly in order to inhibit the reaction gas from taking a shortcut to an adjacent flow path by seeping past the ribs, a phenomenon referred to as path cutting, and is often used in fuel cells or the like that have so-called serpentine gas flow paths.

However, even with ribs that are structured in the manner described above, it is difficult to sufficiently inhibit path cutting of the reaction gas. When such path cutting occurs and the reaction gas takes a shortcut in the course of its flow, the flow of the gases along their gas flow paths becomes disturbed which reduces the gas stoichiometry in the power generating region, thus reducing power generating performance.

SUMMARY OF THE INVENTION

This invention thus provides a fuel cell that is capable of suppressing path cutting in which reaction gas crosses over a rib.

As described above, the phenomenon in which reaction gas path-cuts by crossing over ribs tends to occur-particularly at a portion around the electrode portion (i.e., at a portion just to the outside of the electrode outer edge) of the MEA (Membrane Electrode Assembly). This is because even with structures in which a seal is provided between the separator and the MEA using a gasket or by adhering the separator and the MEA together, for example, when a part such as a resin frame is provided, a gap due to the structure can form at the outermost peripheral portion of the flow path which is caused by part tolerance or assembly tolerance. Considering that a gap may form between the separator and the MEA at the portion just to the outside of the electrode outer edge of the MEA in this way which allows gas to leak out from that gap portion into an adjacent flow path, it is desirable to effectively use a liquid or gel sealant to effectively suppress this path cutting phenomenon. A liquid or gel sealant having a flow property which hardens after spreading around to some degree more can easily fill in local gaps than a sealant such as a gasket or packing. In addition, such a sealant can also easily accommodate slight differences in each cell which are caused by part tolerance or assembly tolerance.

One aspect of the invention thus relates to a fuel cell that includes an electrode; a separator, wherein the electrode and the separator are stacked together; a rib which is provided on the separator and forms a reaction gas flow path; and a sealant which fixes the rib and the electrode, is impregnated in the electrode, and has a flow property, wherein porosity of a portion of the electrode that is impregnated with the sealant is lower than the porosity of another portion of the electrode. The liquid sealant which is formed of an adhesive, for example, impregnates the electrode thus reducing the porosity (air permeability) of the electrode. As a result, path cutting of the reaction gas that has passed through the electrode can be suppressed by the amount equal to the extent to which the holes through which the reaction gas can pass are clogged. In this case, the sealant having a flow property may be a gel sealant.

With such a fuel cell, the rib may include a first rib that divides adjacent flow paths where the flows are in the same direction and a second rib that divides adjacent flow paths where the flows are in opposite directions, and the sealant may be provided only for the second rib. When a plurality of reaction gas flow paths are formed parallel to one another, for example, no problems are likely to occur in terms of power generating performance even if path cutting of the reaction gas occurs between the reaction gas paths where the flow is in the same direction. On the other hand, if path cutting of the reaction gas occurs between adjacent reaction gas flow paths where the flows are in opposite directions, the gas stoichiometry will decrease which may lower the power generating performance. In this respect, the aspect of the invention in which the sealant is provided for the second rib that divides the flow paths where the flows are in opposite directions enables path cutting which may lead to lower power generating performance to be effectively suppressed.

Furthermore, with this kind of fuel cell, the sealant may be selectively provided only on a connecting portion of the second rib and the electrode at an outer edge of an area through which the reaction gas flows. As described above, a gap may form between the separator and the MEA at a portion just to the outside of the electrode outer edge, and path cutting may occur through this gap. In this respect, the aspect of the invention in which the sealant is selectively provided at the portion where the second rib (i.e., the rib that divides adjacent flow paths where the flows are in opposite directions) contacts the electrode at the outer edge of the area through which gas flows enables path cutting which may lower power generating performance to be effectively suppressed.

Also, the separator may have a sealant storage portion which is depressed in the thickness direction from a top portion of the rib for storing surplus sealant. As described above, the sealant has a flow property so it spreads out, flowing out after it is applied until it hardens. In some cases, it may even spread out beyond a predetermined area and cover the surface of the MEA electrode. In this respect, with the fuel cell of the aspect of the invention, the sealant storage portion provided in the separator keeps the spread of the sealant within a fixed area, thus inhibiting the sealant from covering the MEA electrode unnecessarily and reducing the power generating area.

Further, only an end portion of the electrode may be formed thick at at least part of a portion where there is a gap between the electrode and the sealant. When the MEA (Membrane Electrode Assembly) and the separator are stacked together, the portion that was formed thick in this way contacts the inside surface of the separator, thus inhibiting the reaction gas from leaking out of the MEA.

Also, in this case, the portion that is formed thick of the end portion of the electrode may be formed by providing a member having elasticity that is separate from the electrode. In this case, it is possible to even more effectively suppress the reaction gas from leaking out by the deformed elastic member contacting the separator while exhibiting elasticity.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF THE PREFERRED EMBODIMENTS

In the following description and the accompanying drawings, the present invention will be described in more detail in terms of example embodiments.

FIGS. 1 to 9 show an example embodiment of a fuel cell according to the invention. In the fuel cell (hereinafter also simply referred to as "cell") 2 in this example embodiment, ribs 21 provided on a separator 20 and electrode 32 (32a and 32b) are fixed by a liquid sealant and the liquid sealant impregnated in the electrode 32 reduces the porosity of the electrode is less than it is at other portions. As a result, path cutting of the reaction gas that flows through the electrode 32 is inhibited by an amount equal to the extent to which the holes that allow the reaction gas to pass through are clogged.

In the example embodiment described below, first the general structure of the cells 2 that make up the fuel cell 1, as well as the general structure of a cell stack body 3 that is formed of a plurality of stacked cells 2 will be described. Then the structure for effectively inhibiting path cutting of the reaction gas will be described.

Figure 1:
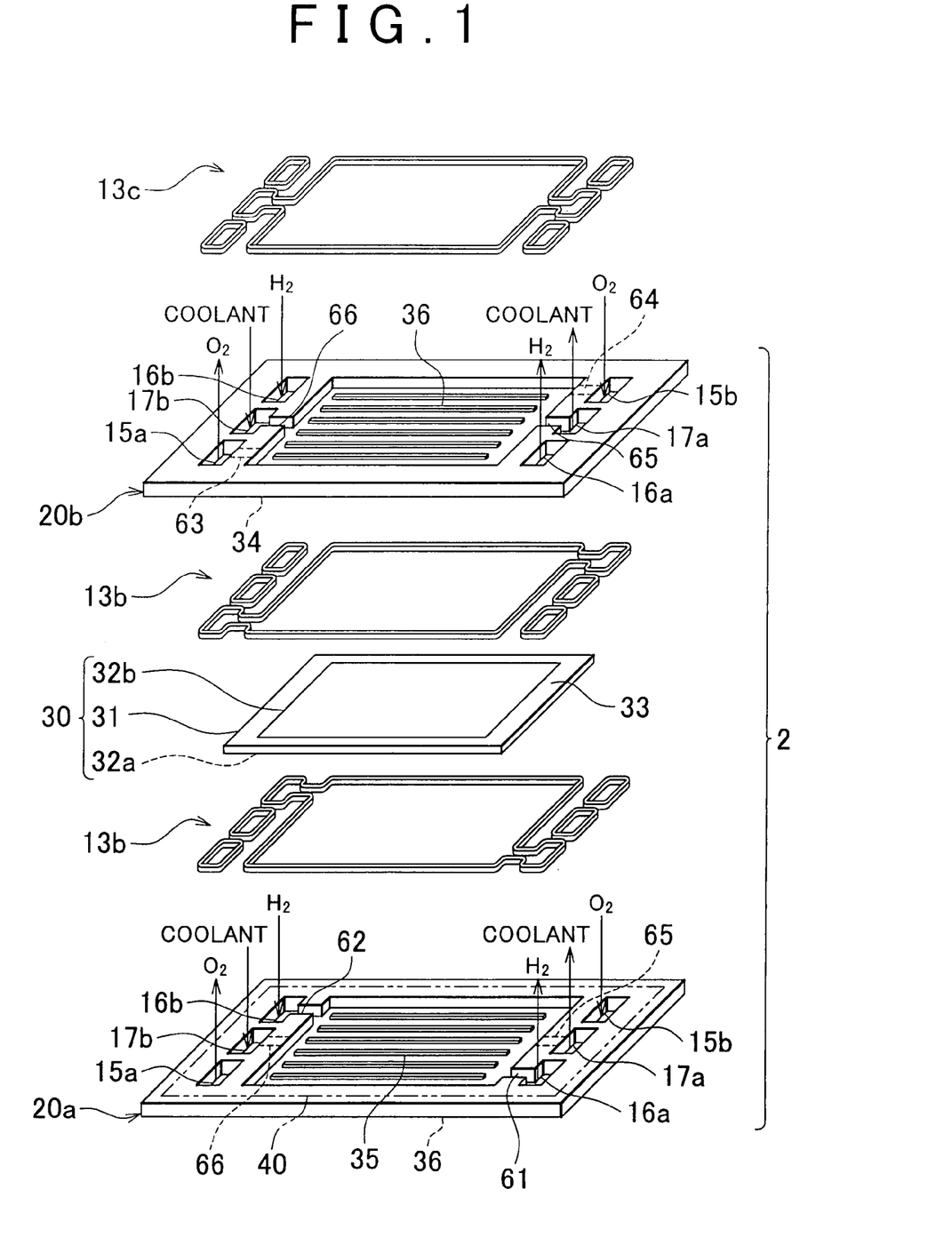
FIG. 1 is an exploded perspective view of an example structure of a fuel cell according to an example embodiment of the invention.

FIG. 1 is a schematic view of the general structure of one of the cells 2 of the fuel cell 1 in this example embodiment. A plurality of the cells 2 structured as shown in the drawing are stacked together in series to form a cell stack body 3 (see FIG. 2). Also, the fuel cell stack formed by this cell stack body 3 and the like is then bound with a load applied in the stacking direction while, for example, both ends of the stack are sandwiched between a pair of end plates 8 and restraining members formed of tension plates 9 are then arranged in such a way as to fasten these end plates 8 together (see FIG. 2).

Incidentally, the fuel cell 1 formed by such a fuel cell stack and the like can be used as an on-board power generating system of a fuel cell vehicle (FCHV: Fuel Cell Hybrid Vehicle), for example, but is not limited to this. That is, the fuel cell 1 can also be used as a power generating system mounted in, for example, various types of mobile bodies (such as marine vessels and airplanes) or an automatable body such as a robot or the like, and can also be used as a stationary power generating system.

The cell 2 includes an electrolyte (a specific example of which is a membrane electrode assembly, hereinafter referred to as "MEA") 30, and a pair of separators 20 (indicated by reference characters 20a and 20b in FIG. 1) that sandwich the MEA 30, and the like (see FIG. 1). The MEA 30 and the separators 20a and 20b are each formed in a generally rectangular plate shape. Also, the MEA 30 is formed so that the outer shape thereof is smaller than the outer shapes of the separators 20a and 20b.

The MEA 30 includes a polymer electrolyte membrane made of an ion-exchange membrane of polymer material (hereinafter also simply referred to as "electrolyte membrane") 31, and a pair of electrodes (an anode side diffusion electrode and a cathode side diffusion electrode) 32a and 32b that sandwich the electrolyte membrane 31 from both sides (see FIG. 1). The electrolyte membrane 31 is formed larger than the electrodes 32a and 32b. The electrodes 32a and 32b are joined by a hot press method, for example, to the electrolyte membrane 31 in positions such that the peripheral edge portions 33 of the electrolyte membrane 31 are left uncovered.

The electrolytes 32a and 32b that make up part of the MEA 30 are formed of porous carbon material (diffusion layers), for example, that carry a catalyst such as platinum adhered to the surface. Hydrogen gas is supplied as a fuel gas (a reaction gas) to one of the electrodes (the anode) 32a while oxidizing gas (a reaction gas) such as air or an oxidizing agent is supplied to the other electrode (the cathode) 32b. Electromotive force is then generated in the cell 2 by the electrochemical reaction that takes place between these two types of reaction gases in the MEA 30.

The separators 20 (20a and 20b) are formed of gas impermeable conductive material such as carbon, hard conductive resin, or a metal such as aluminum or stainless steel. The substrates of the separators 20 (20a and 20b) in this example embodiment are formed of plate-shaped metal (i.e., a metal separator), and a highly corrosion resistant membrane (such as a membrane formed of gold plating) is formed on the surfaces of these substrates that are nearest the electrodes 32a and 32b.

Also, groove-shaped flow paths formed by a plurality of concave portions are formed on both sides of the separators 20a and 20b. These flow paths can be formed by press forming in the case of the separators 20a and 20b of this example embodiment in which the substrates are formed of plate-shaped metal, for example. The groove-shaped flow paths formed in this way form a gas flow path 34 for the oxidizing gas, a gas flow path 35 for the hydrogen gas, or a so-called coolant flow path 36. More specifically, a plurality of the gas flow paths 35 for hydrogen gas are formed on the inside surface, i.e., on the side nearest the electrode 32a, of the separator 20a, while a plurality of the coolant flow paths 36 are formed on the back side (i.e., on the outside surface) of that separator 20a (see FIG. 1). Similarly, a plurality of the gas flow paths 34 for oxidizing gas are formed on the inside surface, i.e., on the side nearest the electrode 32b, of the separator 20b, while a plurality of the coolant flow paths 36 are formed on the back side (i.e., on the outside surface) of that separator 20b (see FIG. 1). For example, in this example embodiment, the structure is such that with two adjacent cells 2, both of the coolant flow paths 36 when the outside surface of the separator 20a of one cell 2 is matched up with the outside surface of the separator 20b of the adjacent cell 2 come together to form a single coolant flow path 36 having a cross section that is rectangular or honeycomb-shaped, for example.

Further, as described above, the separators 20a and 20b are such that at least the concave and convex shapes for forming the fluid flow paths are reversed on the front and back surfaces. More specifically, with the separator 20a, the back surface of the convex shape (convex rib) that forms the gas flow path 35 for the hydrogen gas serves as the concave shape (concave groove) that forms the coolant flow path 36, and the back surface of the concave shape (concave groove) that forms the gas flow path 35 serves as the convex shape (convex rib) that forms the coolant flow path 36. Moreover, with the separator 20b, the back surface of the convex shape (convex rib) that forms the gas flow path 34 for the oxidizing gas serves as the concave shape (concave groove) that forms the coolant flow path 36, and the back surface of the concave shape (concave groove) that forms the gas flow path 34 serves as the convex shape (convex rib) that forms the coolant flow path 36.

Also, an oxidizing gas inlet side manifold 15a, a hydrogen gas outlet side manifold 16b, and a coolant outlet side manifold 17b are formed near the end portion in the lengthwise direction of the separators 20a and 20b (i.e., near the one end portion shown on the left side in FIG. 1 in the case of this example embodiment). In this example embodiment, for example, these manifolds 15a, 16b, and 17b are formed by generally rectangular or trapezoidal holes formed in the separators 20a and 20b (see FIG. 1). Furthermore, an oxidizing gas outlet side manifold 15b, a hydrogen gas inlet side manifold 16a, and a coolant inlet side manifold 17a are formed at the end portion on the side of the separators 20a and 20b opposite the manifolds 15a, 16b, and 17b. In this example embodiment, these manifolds 15b, 16a, and 17a are also formed by generally rectangular or trapezoidal holes (see FIG. 1). Incidentally, in FIG. 2 and the like, the reference characters of the manifolds are shown without letters a and b appended.

Of the manifolds described above, the hydrogen gas inlet side manifold 16a and outlet side manifold 16b of the separator 20a are open to the gas flow path 35 for the hydrogen gas via an inlet side connecting passage 61 and an outlet side connecting passage 62, respectively, which are formed in groove-shapes in the separator 20a. Similarly, the oxidizing gas inlet side manifold 15a and outlet side manifold 15b of the separator 20b are open to the gas flow path 34 for the oxidizing gas via an inlet side connecting passage 63 and an outlet side connecting passage 64, respectively, which are formed in groove-shapes in the separator 20b (see FIG. 1). Moreover, the coolant inlet side manifold 17a and outlet side manifold 17b of the separators 20a and 20b are open to the coolant flow path 36 via an inlet side connecting passage 65 and an outlet side connecting passage 66, respectively, which are formed in groove-shapes in the separators 20a and 20b. The structure of the separators 20a and 20b described thus far enables oxidizing gas, hydrogen gas, and coolant to be supplied to the cell 2. A specific example will now be given. When the cells 2 are stacked, hydrogen gas, for example, flows from the inlet side manifold 16a of the separator 20a into the gas flow path 35 through the connecting passage 61. After serving to generate power in the MEA 30, the hydrogen gas then flows through the connecting passage 62 and out through the outlet side manifold 16b.

A first seal member 13a and a second seal member 13b are both formed of a plurality of members (such as four small rectangular frame bodies and a large frame body that forms a fluid flow path) (see FIG. 1). Of these, the first seal member 13a is provided between the MEA 30 and the separator 20a. More specifically, the first seal member 13a is provided so that a portion thereof is interposed between the peripheral edge portion 33 of the electrolyte member 31 and a portion of the separator 20a that surrounds the gas flow path 35. Also, the second seal member 13b is provided between the MEA 30 and the separator 20b. More specifically, the second seal member 13b is provided so that a portion thereof is interposed between the peripheral edge portion 33 of the electrolyte member 31 and a portion of the separator 20b that surrounds the gas flow path 34.

Moreover, a third seal member 13c which is formed of a plurality of members (such as four small rectangular frame bodies and a large frame body that forms a fluid flow path) is provided between the separator 20a and the separator 20b of adjacent cells 2 (see FIG. 1). This third seal member 13c is provided interposed between a portion of the separator 20b around the coolant flow path 36 and a portion of the separator 20a around the coolant path 36, providing a seal therebetween.

The first to the third seal members 13a to 13c may each be made of an elastic body (a gasket) that seals in fluid by physically contacting the adjacent member, or of an adhesive or the like that adheres by a chemical bond with the adjacent member. In this example embodiment, for example, each of the seal members 13a to 13c is a member that provides a physical seal using elasticity. Alternatively, however, each member 13a to 13c may also be a member that provides a seal by a chemical bond, such as an adhesive described above.

A frame-shaped member 40 is a member that is made of resin, for example, and sandwiched, together with the MEA 30, between the separators 20a and 20b (hereinafter this frame-shaped member may also be referred to as a "resin frame"). In this example embodiment, for example, the resin frame 40 which has a thin frame shape is interposed between the separators 20a and 20b and sandwiches at least a portion, such as the portion along the peripheral edge portion 33, of the MEA 30 from the front and back sides. The resin frame 40 provided in this manner thus functions 1) as a spacer between the separators 20 (20a and 20b) that supports the clamping force, 2) as an insulating member, and 3) as a stiffening member that reinforces the rigidity of the separators 20 (20a and 20b).

Figure 2:
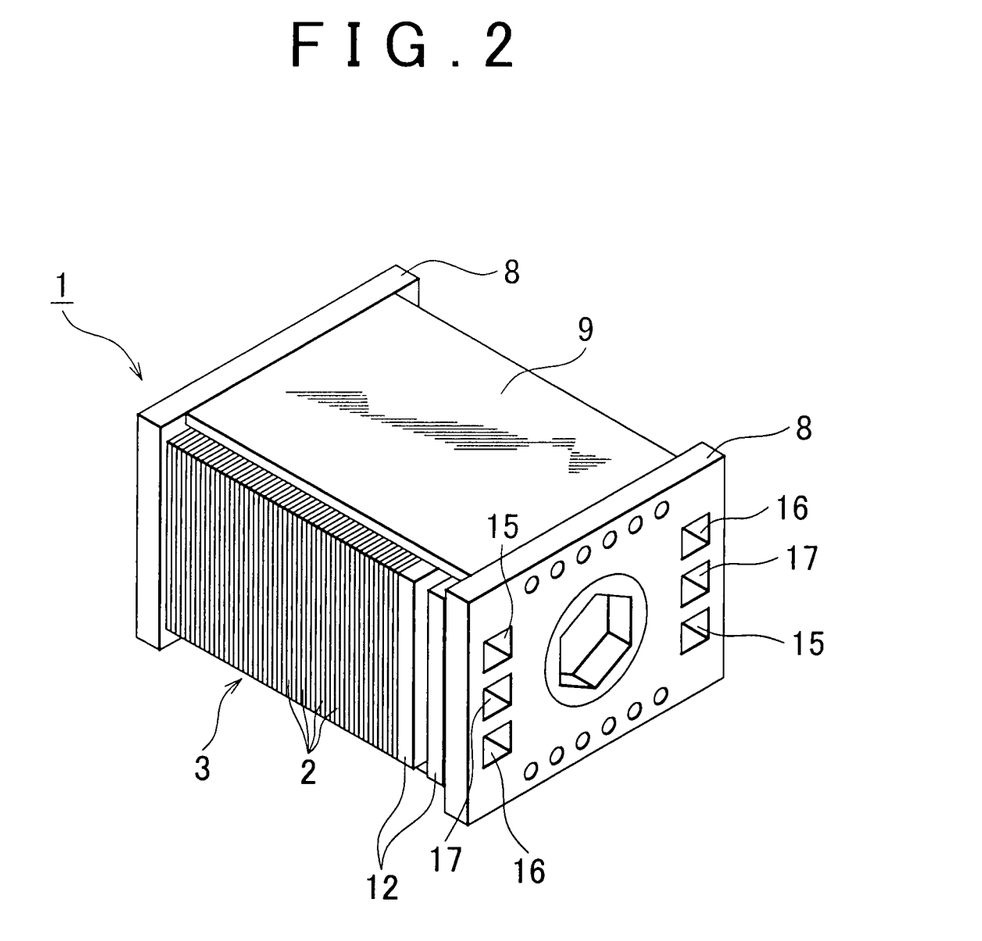
FIG. 2 is a perspective view schematically showing an example structure of a fuel cell stack.

Next, a simple description of the structure of the fuel cell 1 will be given (see FIG. 2). The fuel cell 1 in this example embodiment includes the cell stack body 3 in which a plurality of the cells 2 are stacked together. A collector plate with an output terminal, an insulating plate, and an end plate 8 are then each arranged in order on the outsides of the cells 2 that are positioned at both ends of the cell stack body 3 (see FIG. 2). Further, tension plates 9 that bind the cell stack body 3 and the like in a stacked state are provided spanning between the end plates 8, e.g., a pair of the tension plates 9 is arranged facing both sides of the stack (see FIG. 2). The tension plates 9 are connected to the end plates 8, keeping a predetermined clamping force (i.e., compression load) applied in the stacking direction of the cell stack body 3. Further, an insulating film, not shown, for preventing electrical leakage and sparking is formed on the inside surface (i.e., the surface facing the cell stack body 3) of the tension plates 9. This insulating film is formed, for example, with insulating tape adhered to the inside surface of the tension plates 9 or a resin coating applied to cover the surface, or the like. Incidentally, a pair of plate-shaped members 12 sandwich an elastic module formed of a coil spring, for example, that applies clamping force (i.e., a compression load) to the fuel cell stack (see FIG. 2).

Continuing on, the structure of the cell (i.e., the fuel cell) 2 related to this example embodiment, which effectively inhibits path cutting of the reaction gas will be described (see FIG. 4, etc.)

In this example embodiment, a plurality of ribs 21 are provided on both sides of the separators 20 (20a and 20b). The gas flow path 34 for oxidizing gas, the gas flow path 35 for hydrogen gas, and the coolant flow path 36 are formed by the concave portions formed between these plurality of ribs 21. As described above, in the cell 2, the ribs 21 provided on the separators 20, and the electrodes 32 (32a and 32b) are fixed by a liquid sealant. This liquid sealant impregnated in the electrodes 32 reduces the porosity (i.e., the percentage of holes through which reaction gas can pass) of the electrodes 32. As a result, in the portion impregnated with the liquid sealant, the holes through which reaction gas can pass is less than it is at least in other portions, thus making it more difficult for reaction gas to pass through, which enables path cutting to be inhibited to a corresponding degree.

A liquid adhesive is one example of the liquid sealant used here, but the liquid sealant is not particularly limited to this specific example. Further, the properties such as the flow property (viscosity) of the liquid sealant are also not particularly limited. In addition, a sealant referred to as a sealing agent, a sealant in gel form, or liquid packing, for example, may also be used.

Figure 3:
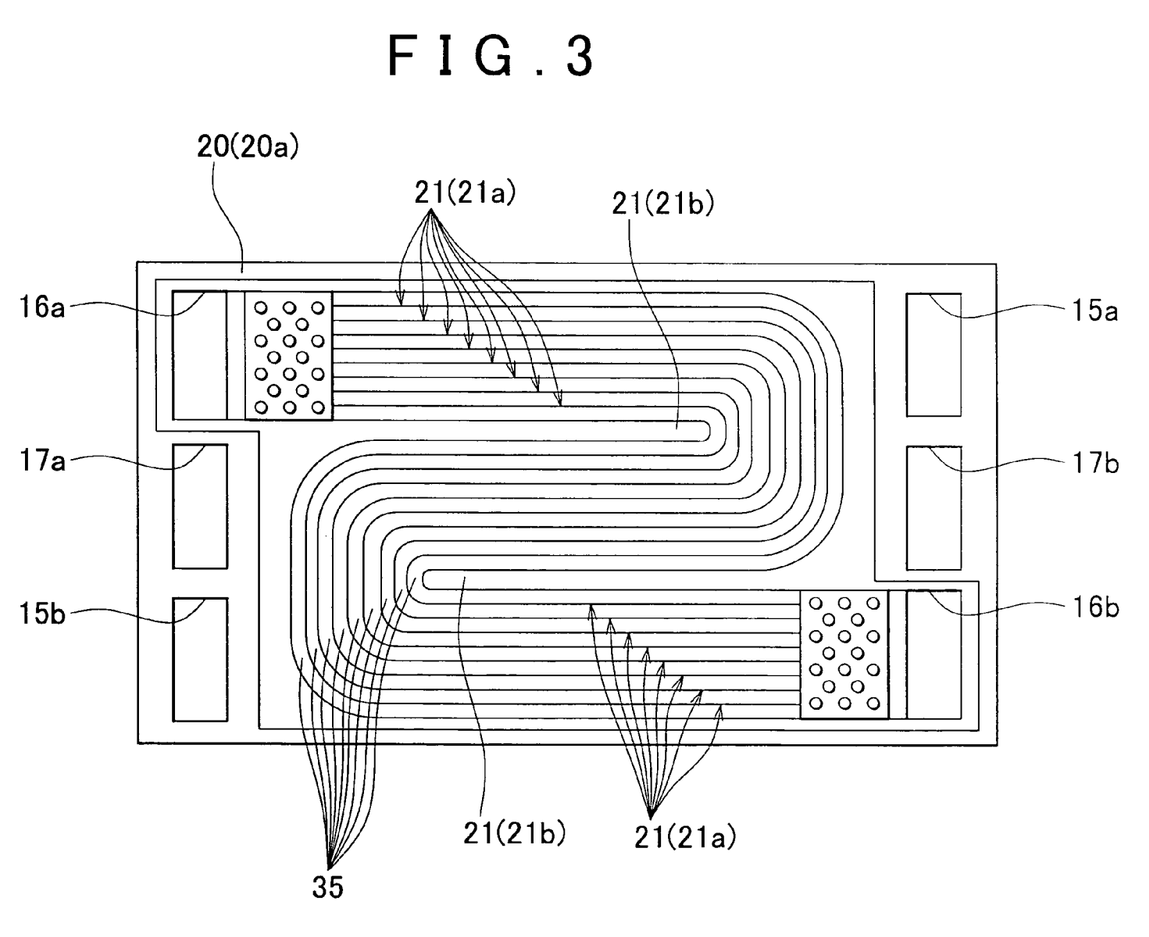
FIG. 3 is a plan view schematically showing an example shape of a separator on a hydrogen gas flow path side.

Hereinafter, an example embodiment will be described in which the invention has been applied to a separator 20 having a so-called serpentine flow path 35 (see FIGS. 3 and 4). Incidentally, FIG. 4 schematically shows only the main ribs 21 that form the serpentine flow path (i.e., second ribs 21b that divide adjacent flow paths where the flows are in opposite directions). However, other ribs (i.e., first ribs 21a that divide adjacent flow paths where the flows are in the same direction) may also be provided between these ribs 21 (see FIGS. 3 and 5).

Here, in this example embodiment, when both the first ribs 21a and the second ribs 21b are provided as described above, the liquid sealant is provided only for the second ribs 21b. For example, when a plurality of the hydrogen gas flow paths 35 are formed parallel with one another, no particular problem will occur in terms of power generating performance even if path cutting of the hydrogen gas occurs between the hydrogen gas flow paths 35 where the flow is in the same direction. On the other hand, if path cutting of the hydrogen gas occurs between adjacent hydrogen gas flow paths 35 where the flows are in opposite directions, the gas stoichiometry will decrease which may lower the power generating performance. In this respect, providing the liquid sealant for the second ribs 21b that divide the flow paths 35 where the flows are in opposite directions enables path cutting, which may lead to lower power generating performance, to be effectively suppressed. Moreover, limiting the locations where the liquid sealant is applied to the portions where it is particularly necessary in this way is also effective for achieving the desired effect while reducing material loss.

Also, when the locations where the liquid sealant is applied is limited in this way, the liquid sealant may be selectively provided only where the second ribs 21b contact the electrode 32 at an outer edge of the area where the hydrogen gas flows. While gaps may form between the separators 20 at the portion just to the outside the outer edge of the electrode 32 and path cutting may occur at those gaps, selectively providing the liquid sealant at the portions where the second ribs 21b contact the electrode 32 at the outer edge of the area where the hydrogen gas flows enables path cutting, which may reduce the power generating performance, to be even more effectively suppressed.

Figure 4:
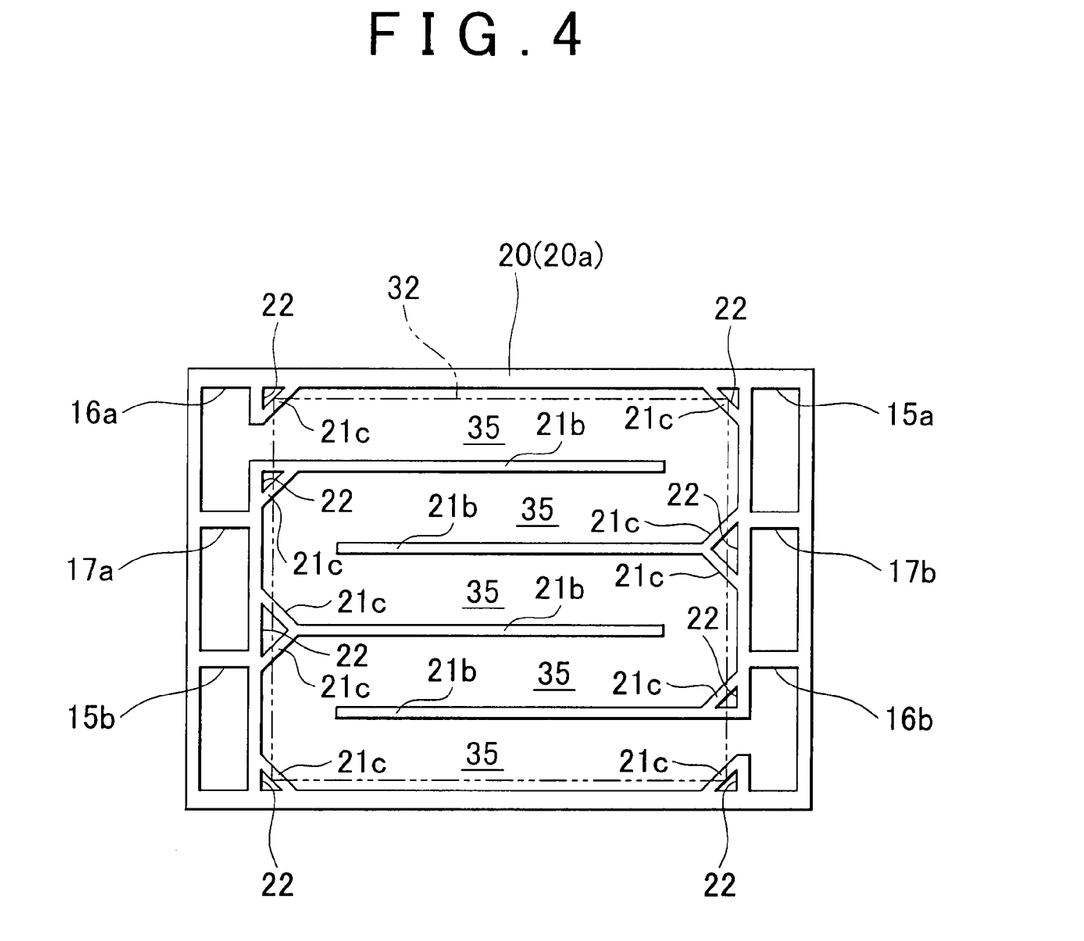
FIG. 4 is a plan view schematically showing an example shape of a cell in which a liquid sealant storage portion is provided on a rib.
Figure 5:
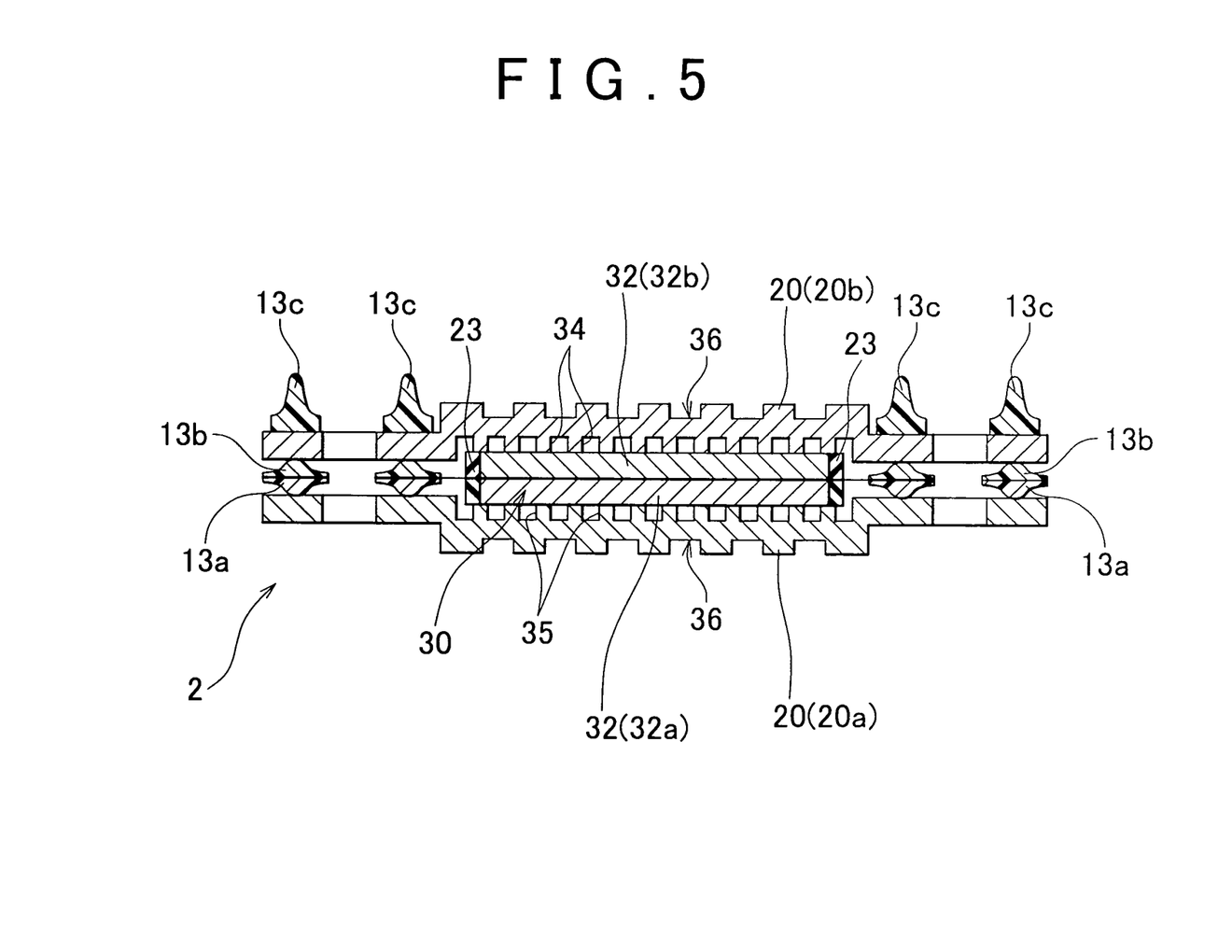
FIG. 5 is a view schematically showing an example of a sectional shape of the fuel cell.

Moreover, in this example embodiment, in order to store surplus liquid sealant, liquid sealant storage portions 22 which are depressed in the thickness direction from the top of the ribs 21 are provided (see FIG. 4). The liquid sealant may spread out to a large extent depending on the material as it flows out between the time it is applied and the time it hardens, and may even spread out beyond the predetermined area and cover the surface of the electrode 32. In this example embodiment, however, the liquid sealant storage portions 22 provided in the separator 20 keep the spread of the liquid sealant within a fixed area, thus keeping the liquid sealant from spreading beyond the predetermined area and covering the electrode 32 unnecessarily. As a result, a reduction in the power generating area can be suppressed.

The liquid sealant storage portions 22 are not particularly limited to this specific example. For example, in the example embodiment, oblique ribs 21c are provided at each turn portion in the serpentine flow path 35 and at the corner portions of the hydrogen gas inlet (hydrogen gas inlet side manifold 16a) and outlet (hydrogen gas outlet side manifold 16b) so as to form a generally triangular space which serves as the liquid sealant storage portion 22 (see FIG. 4). Incidentally, the ribs are generally Y shaped at the portions where the oblique ribs 21c are provided on both sides of the second ribs 21b. The liquid sealant storage portions 22 that are formed at these areas are approximately twice the size of the liquid sealant storage portions 22 at other areas.

Also, from the viewpoint of more effectively suppressing path cutting of the hydrogen gas, another structure is also preferably combined with the one described above. For example, in this example embodiment, only an end portion of the electrode (diffusion layer) 32 is formed thick at at least part of a portion where there is a gap between the electrode and the liquid sealant (see FIG. 5). In this case, the air permeability (i.e., the ease with which gas is able to pass through) of the electrode (diffusion) layer 32 is reduced in certain areas, which makes it possible to further suppress hydrogen gas from leaking out to the area around the electrode 32 (i.e., the area just to the outside of the electrode outer edge).

A specific example of this is as follows. For example, a gasket 23 is provided along the area around (i.e., the side surface of) the electrode 23. This gasket 23 is formed thicker than the end portion of the electrode 32 by an amount corresponding to beads 23a that are formed on the front and back of this gasket 23 (see FIGS. 5 and 6). In this case, the beads 23a formed on both sides of the MEA 30 function as lips that press against the surfaces of the separators 20. These beads 23a deform as they are pressed against and thus reduce the air permeability of the electrode 32 in certain areas. The material of the gasket 23 is not particularly limited but is preferably rubber material to maintain this kind of lip function for an extended period of time.

Figure 7:
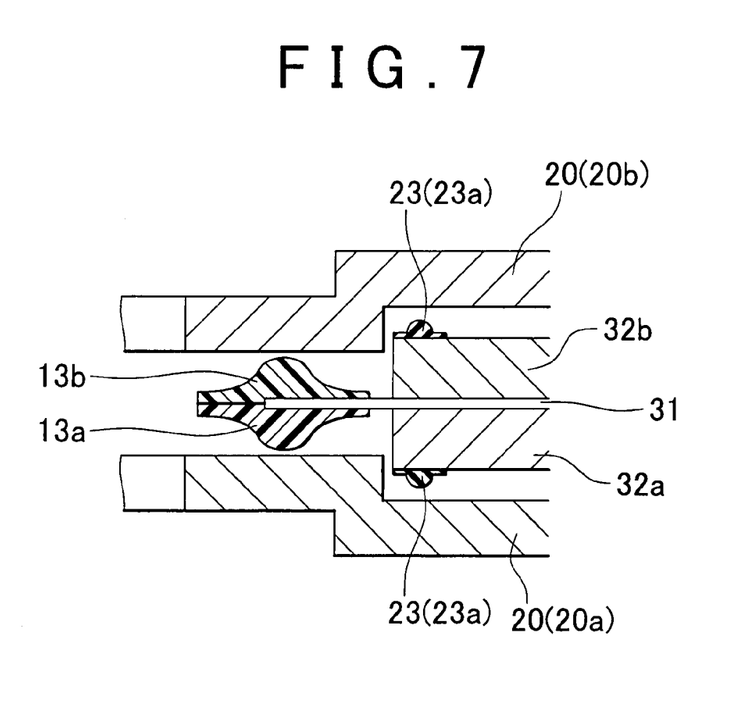
FIG. 7 is a view of another example of a bead of a gasket formed on the outer periphery (the side surface) of the electrode.
Figure 8:
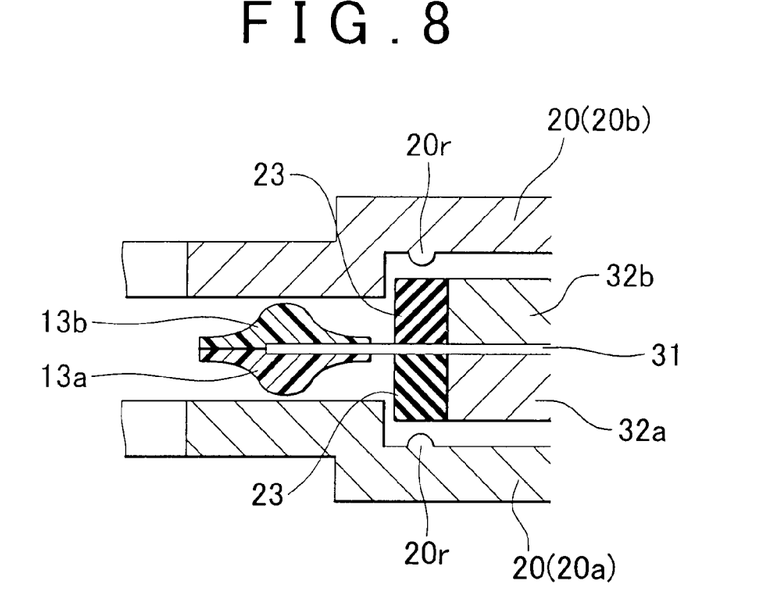
FIG. 8 is a view of another example of a structure for reducing air permeability in certain parts of the electrode.
Figure 9:
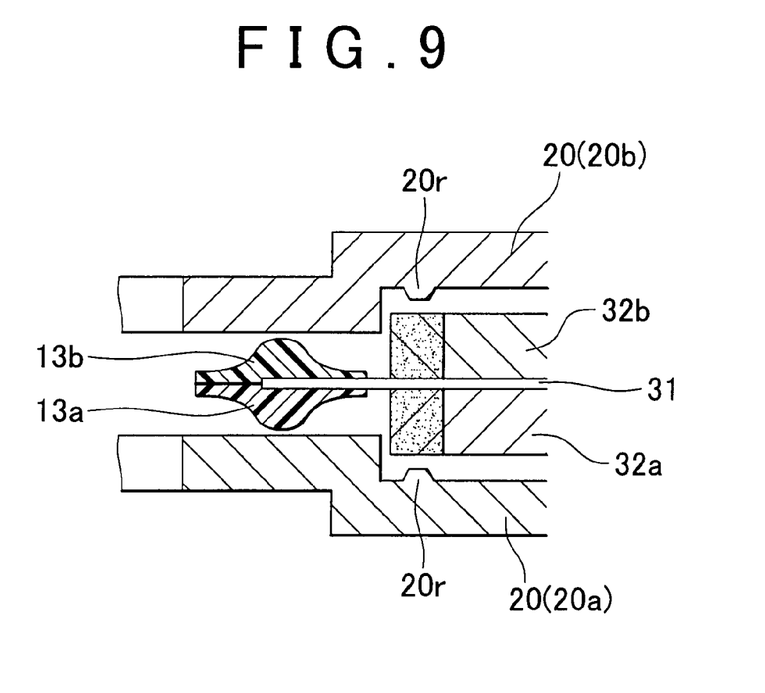
FIG. 9 is a view of yet another example of a structure for reducing air permeability in certain parts of the electrode.

Alternatively, a gasket 23 may be provided on both the front and back surfaces along the outer periphery of the electrode 32 and beads may be formed on that gasket 23 (see FIG. 7). In this example embodiment, the air permeability is synergistically reduced by impregnating the outer peripheral portion of the electrode 32 with liquid sealant and in addition providing the gasket 23 on both sides of that portion.

Figure 6:
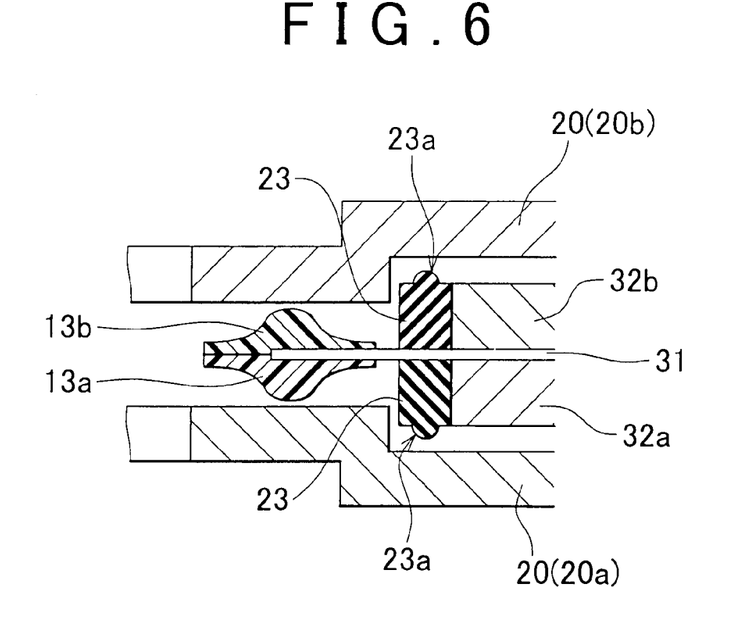
FIG. 6 is a view of one example of a bead of a gasket formed on an outer periphery (the side surface) of an electrode.

Incidentally, FIGS. 6 and 7 only illustrate preferred examples. In addition to these, the air permeability of the electrode 32 can also be reduced in certain areas by, for example, forming the electrode 32 itself thicker in certain areas, providing rib-shaped protrusions 20r on the inner peripheral surfaces of the separators 20 in positions aligned with the position of a gasket 23 without beads that is formed on the outer periphery (the side surface) of the electrode 32 (see FIG. 8), or providing rib-shaped protrusions 20r on the inner peripheral surfaces of the separators 20 in positions aligned with portions of the electrode 32 that have been impregnated with liquid sealant (i.e., the portion shown with dots in FIG. 9). However, from the viewpoint of height and sealability of the lips that contact the separators 20, a separate seal (such as the gasket 23 described above) is preferably provided independently from the electrode 32 as shown by this example embodiment.

As described thus far, in the cell (i.e., the fuel cell) 2 of this example embodiment, a portion of the electrode 32 of the MEA 30 is impregnated with a liquid sealant, which reduces the porosity of the electrode 32. For example, even if there is a gap between the separators 20 and the MEA 30 at a portion just to the outside of the electrode outer edge of the MEA 30, this kind of cell 2 inhibits hydrogen gas from leaking out through that gap portion and seeping out to an adjacent flow path 35, i.e., path cutting across ribs 21.

Moreover, as described above, in this example embodiment liquid sealant storage portions 22 are provided which divide a portion of the ribs 21 thus enabling surplus liquid sealant to be stored. As a result, liquid sealant is prevented from spreading beyond a desired area. Therefore, the power generating surface of the electrode 32 is not covered unnecessarily, which suppresses a decrease in the power generating area. As a result, a decrease in power generating performance caused by the liquid sealant can be avoided.

In addition, according to the cell 2 of this example embodiment in which only the end portion of the electrode 32 is formed thick by providing the beads 23a on the gasket 23, for example, the hydrogen gas can be more effectively suppressed from taking a shortcut in which it flows out through a gap in the outer peripheral portion of the electrode 32.

Incidentally, the foregoing example embodiment is simply a preferred example embodiment of the invention. The invention is in no way limited to this example embodiment. To the contrary, various modifications may be made without departing from the scope of the invention. For example, in the foregoing example embodiment, the invention is applied to the cell 2 which has a serpentine flow path 35. The applicable scope of the invention, however, is not limited to this kind of serpentine flow path. For example, the invention may of course also be applied to a cell 2 in which the flow path 35 straight. However, because path cutting of reaction gas tends to occur particularly at the turn portions of the flow path 35, the invention is preferably applied in particular to a cell 2 that includes the serpentine type separator 20 shown in FIG. 4.

Also, in the foregoing example embodiment, the reaction gas described was hydrogen gas but this is only one example. The invention may also be applied with oxidizing gas just as it is in the example embodiment described above.

According to the example embodiment of the invention, path cutting in which reaction gas crosses over a rib can be suppressed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A fuel cell comprising:
   an electrode;
   a separator, wherein the electrode and the separator are stacked together;
   a plurality of ribs which are provided on a major surface of the separator and which form a reaction gas flow path; and
   a sealant, which fixes at least one rib that divides adjacent flow paths among the plurality of ribs and the electrode, is impregnated in the electrode, and has a flow property, wherein porosity of a portion of the electrode that is impregnated with the sealant is lower than the porosity of another portion of the electrode;
   wherein the sealant is provided where the at least one rib that divides adjacent flow paths among the plurality of the ribs contacts the electrode;
   wherein the plurality of ribs include at least one first rib that divides adjacent flow paths where the flows are in the same direction and at least one second rib that divides adjacent flow paths where the flows are in opposite directions to form a serpentine flow path, and
   a plurality of oblique ribs are provided, wherein an oblique rib is located at each turn portion in the serpentine flow path, wherein a generally triangular void is formed by at least one oblique rib, the void serves as a liquid sealant storage portion; and
   wherein the liquid sealant storage portion is depressed in the thickness direction.

2. The fuel cell according to claim 1, wherein the sealant is formed of at least one of a liquid sealant and a gel sealant.

3. The fuel cell according to claim 1, wherein the sealant is provided only for the at least one second rib.

4. The fuel cell according to claim 3, wherein the sealant is selectively provided only on a connecting portion of the at least one second rib and the electrode at an outer edge of an area through which the reaction gas flows.

5. The fuel cell according to claim 1, wherein only an end portion of the electrode is formed thick at at least part of a portion where there is a gap between the electrode and the sealant.

6. The fuel cell according to claim 5, wherein the portion that is formed thick of the end portion of the electrode is formed by providing a member having elasticity that is separate from the electrode.

7. The fuel cell according to claim 1, wherein a protruding portion that protrudes in the separator direction is formed on at least part of an outer peripheral portion of the electrode.

8. The fuel cell according to claim 7, wherein the protruding portion is provided with a member having elasticity that is separate from the electrode.

9. The fuel cell according to claim 1, wherein a reaction gas inlet and a reaction gas outlet are formed on the separator and oblique ribs are provided at corner portions of the reaction gas inlet and the reaction gas outlet.

10. The fuel cell according to claim 1, the sealant storage portion is defined by the oblique rib and two ribs to which the oblique rib is connected, the two ribs forming the turn portion in the serpentine flow path.

11. The fuel cell according to claim 1, the sealant storage portion is defined by two oblique rib provided on both sides of the second rib, and a rib to which the two oblique ribs are connected.

* * * * *